(12) United States Patent
Payne

(10) Patent No.: US 7,193,393 B1
(45) Date of Patent: Mar. 20, 2007

(54) APPROACH FOR CHARGING MULTIPLE BATTERIES

(76) Inventor: James C. Payne, 244 County Rd. 42, Apple Valley, MN (US) 55124

( * ) Notice: Subject to any disclaimer, the term of this patent is extended or adjusted under 35 U.S.C. 154(b) by 0 days.

(21) Appl. No.: 10/688,202

(22) Filed: Oct. 17, 2003

Related U.S. Application Data

(63) Continuation-in-part of application No. 10/045,636, filed on Oct. 26, 2001, now Pat. No. 6,636,014.

(51) Int. Cl.
*H01M 10/46* (2006.01)

(52) U.S. Cl. ..................................... 320/119

(58) Field of Classification Search ............... 320/124, 320/137, 107, 116, 118, 119
See application file for complete search history.

(56) References Cited

U.S. PATENT DOCUMENTS

| | | | |
|---|---|---|---|
| 4,647,139 A | 3/1987 | Yang | |
| 4,649,332 A | 3/1987 | Bell | |
| 4,829,223 A | 5/1989 | Broberg et al. | |
| 4,885,524 A | 12/1989 | Wilburn | |
| 5,013,259 A | 5/1991 | Maurer | |
| 5,168,205 A * | 12/1992 | Kan et al. | 320/160 |
| 5,371,454 A | 12/1994 | Marek | |
| 5,418,444 A | 5/1995 | Cook et al. | |
| 5,483,144 A | 1/1996 | Marek | |
| 5,528,148 A * | 6/1996 | Rogers | 320/137 |
| 5,563,493 A * | 10/1996 | Matsuda et al. | 320/124 |
| 5,583,414 A | 12/1996 | Lawrence | |
| 5,646,504 A * | 7/1997 | Feldstein | 320/119 |
| 5,727,372 A | 3/1998 | Kanitz et al. | |
| 5,896,022 A | 4/1999 | Jacobs, Sr. | |
| 5,963,013 A | 10/1999 | Watson et al. | |
| 6,166,516 A | 12/2000 | Albright et al. | |
| 6,198,251 B1 * | 3/2001 | Landon | 320/124 |
| 6,291,965 B1 * | 9/2001 | Nagai et al. | 320/106 |
| 6,636,014 B1 | 10/2003 | Payne | |
| 6,741,065 B1 * | 5/2004 | Ishii et al. | 320/122 |

\* cited by examiner

*Primary Examiner*—Edward H. Tso

(57) ABSTRACT

According to an example embodiment, an arrangement charges equipment batteries, for example, while the equipment is being towed by a towing vehicle. In this example application, the towing vehicle has a primary battery and a rearward-located hitch for towing a trailer that carries the equipment batteries. The arrangement includes a charging circuit that automatically alternates a power connection from the primary battery to each of the equipment batteries, one battery at a time.

13 Claims, 4 Drawing Sheets

APPROACH FOR CHARGING MULTIPLE BATTERIES

RELATED PATENT DOCUMENTS

This is a continuation-in-part of U.S. patent application Ser. No. 10/045,636, filed on Oct. 26, 2001, now U.S. Pat. No. 6,636,014 and entitled "Approach for Charging Trailered Battery," which is incorporated herein by reference and to which priority is claimed under 35 U.S.C. § 120 for common subject matter.

FIELD OF THE INVENTION

The present invention is directed to battery charging arrangements and, more specifically, to arrangements for charging multiple batteries in an efficient manner when one or more of the batteries are not in normal use, for example, as is applicable for towed and trailered vehicle batteries or construction batteries to be used after equipment is towed.

BACKGROUND

There have been previous approaches to charging batteries, including those mounted on a towed vehicle. Examples of such approaches are described in U.S. Pat. No. 4,647,139 (Yang); U.S. Pat. No. 4,649,332 (Bell); U.S. Pat. No. 4,829,223 (Broberg); U.S. Pat. No. 4,885,524 (Wilburn); U.S. Pat. No. 5,013,259 (Maurer); U.S. Pat. No. 5,583,414 (Lawrence); U.S. Pat. No. 5,963,013 (Watson et al.); and U.S. Pat. No. 6,166,516 (Albright). One approach to remote-battery charging includes an electrical circuit having a diode connected in series with a resistor having a resistance value within the range of 200 to 235 ohms. These components are electrically connected in series between the charging source, which is typically the positive terminal of the battery of the towing vehicle, and the positive terminal of the battery on the towed vehicle which needs to be charged. At the beginning of charging operation, the towed vehicle battery is often relatively discharged and the current draw from the towed vehicle battery is relatively significant. After a period of time, as the diode passes the current, the towing vehicle electrical system charges the towed vehicle battery, and the current draw from the towed vehicle battery is reduced. The high-wattage resistor used to reduce the current generated in the charging circuit may be large enough to result in a hazardous condition (e.g., excess heat, possibly causing a fire). Particularly, this may occur when the towing vehicle battery and the towed vehicle battery are improperly connected in reverse polarity, which creates a 24-volt potential, or when the battery on the towed vehicle becomes internally short-circuited. Although use of a high-wattage current-limiting resistor protects against such adverse conditions, a major drawback of this system is that, by including a relatively high resistance in the circuit, the normal or typical charging current is so small that the towed battery receives very little charge, even over long periods of time; this reduction in charge is directly due to the resistance and associated voltage differential across the diode/resistor combination and, to a lesser extent, the inherent resistance of the cables used to interconnect the batteries. Depending upon these resistance values, the rate of charge can be relatively insubstantial and, for relatively short towing trips, unacceptable.

Other disadvantages with the above approaches involve manufacturing, installation and ease of use in various applications. For example, in the construction business, several high-amperage batteries are often used at each construction site, so that the construction worker can rotate use of the batteries and maintain at least one of the batteries charged at all times. Where there is need to charge multiple batteries, the conventional approaches are burdensome insofar as the battery user does not have time to monitor charge time for each battery and typically does not have the time and space for buying and installing multiple battery chargers.

Accordingly, these and other design considerations have presented challenges to efforts to implement an approach to charging multiple batteries that is relatively inexpensive in terms of space and component costs, and also capable of providing an adequately high charge rate.

SUMMARY

The present invention is directed to overcoming the above-mentioned challenges and others related to the types of devices and applications discussed above and in other applications including, but not limited to, vehicle-towed equipment having batteries installed useful at a destination site and to batteries installed at relatively fixed locations. The present invention is exemplified in a number of implementations and applications, some of which are summarized below.

According to an example embodiment of the present invention, a circuit arrangement includes a power-supplying source (e.g., another battery) and a charging circuit that is adapted to charge equipment batteries by automatically alternating the power connection from the power-supplying source to each of the equipment batteries, one battery at a time.

As a more particular example embodiment, the circuit arrangement is installed in a towed-vehicle application and the equipment batteries are charged in this alternate manner so that the batteries are substantially equally charged during the travel time from the towing origin to the towing destination. For example, in an application where the travel time is 20 minutes, when trailering a boat having a pair of trolling-motor batteries, each of the trolling-motor batteries is charged for several minutes (at least about 5 minutes) before the charging power is automatically switched to the other battery. In more specific example embodiments, the equipment batteries are in series (e.g,. two 12-volt batteries to provide a 24-volt power source) and the circuit arrangement is installed in the towed equipment that holds these series-connected batteries to facilitate switching therebetween.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1:
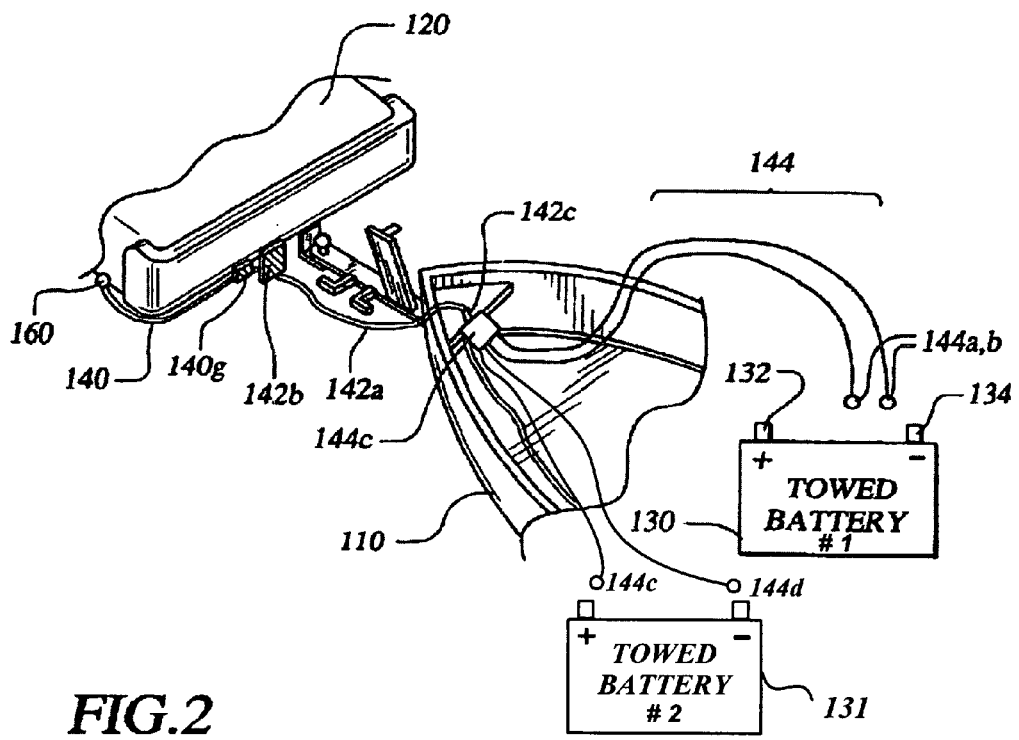
FIG. 1 is an illustration of a system for charging a trailered battery, according to an example embodiment of the present invention.

While the invention is amenable to various modifications and alternative forms, specifics thereof have been shown by way of example in the drawing and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of applications, and has been found to be particularly useful for charging batteries of trailered equipment, such as boats, other water-craft, ATVs, snowmobiles and battery-run construction equipment. While the present invention is not necessarily limited to such applications, various aspects of the invention may be appreciated through a discussion of various examples using this context.

According to various embodiments, the present invention is implemented to charge equipment batteries while the equipment is being towed by a towing vehicle and to charge equipment batteries for relatively stationary equipment. In the embodiment involving equipment being towed by a towing vehicle, the towing vehicle has a primary battery and a rearward-located hitch for towing the trailer that carries the equipment (or secondary) batteries. The arrangement includes a charging unit, multiple sets of electrical lines, each with terminals conveniently adapted for ease of use. A front (vehicle) set of main electrical lines includes terminals at one end thereof for electrically coupling to the anode and cathode of the primary battery and includes a main plug-in adapter at another end thereof, the latter of which is typically installed at the rear of the towing vehicle and is used to connect to the other sets of electrical lines. These other sets of electrical lines provide plug-in connectivity to the charging unit that, in turn, is adapted to charge equipment batteries by automatically alternating the power connection from the power-supplying source to each of the equipment batteries, one battery at a time.

In other more particular embodiments, the charging time for each battery is stopped by timing out at user-settable (or default) intervals (e.g., 5–15 minutes) or by charging and timing out as a function of a user-provided expected travel time, and/or is stopped once each full-charge status is sensed for each battery.

Figure 2:
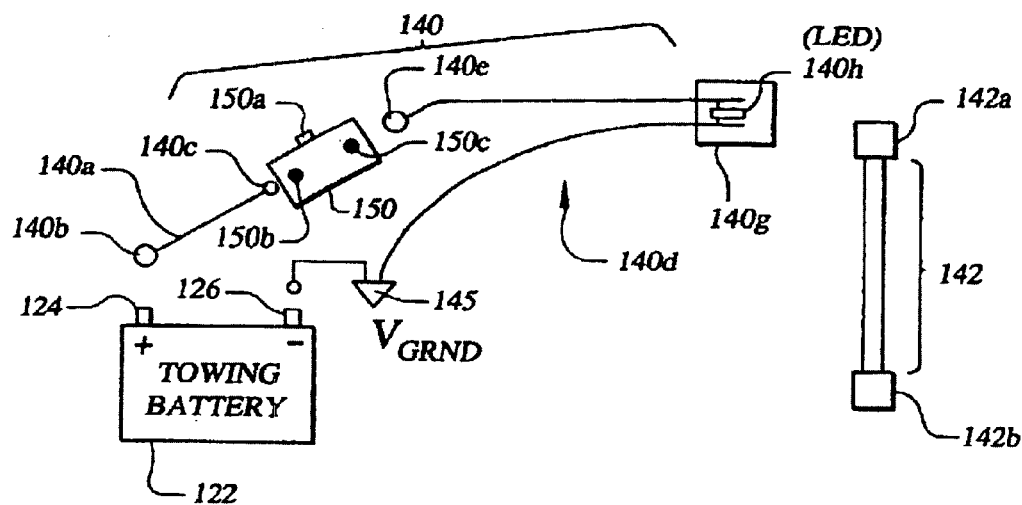
FIG. 2 is an illustration of a charging assembly shown in FIG. 1 and also according to an example embodiment of the present invention.

Consistent with the above embodiments and also in accordance with the present invention, FIGS. 1 and 2 illustrate another example embodiment of the present invention that includes the viewable indicator and power shut-off features in a specific implementation. FIG. 1 shows the overall charging arrangement between a trailered boat 110 that is towed by a towing vehicle 120, and FIG. 2 shows details of assembly articles (with one of the towed batteries shown) used for implementing the arrangement of FIG. 1.

In this example illustration, the vehicle 120 has a primary battery 122 with an anode 124 and a cathode 126 for electrically powering the vehicle 120. Each of the boat (towed) batteries 130 and 131 has an anode 132 and a cathode 134 adapted for powering boat 110 or an accessory on the boat 110 such as a trolling motor (not shown). The arrangement includes main lines 140, intermediary lines 142 and rear lines 144. The main lines 140 include an in-line circuit breaker 150 having a user-engageable reset 150a, a first terminal 150b and a second terminal 150c. In one application the circuit breaker 150 is implemented using a conventional type such as a Shortstop G12 (24 VDC, 30 A).

The main lines 140 include a separable wire 140a with a vehicle terminal 140b at one end thereof for electrically coupling to the anode 124 of the primary battery 122 and another terminal 140c for connecting to the first terminal 150b of the in-line circuit breaker 150. For electrically coupling to the cathode 126 of the primary battery 122 through the towing vehicle ground 145, the main lines 140 also include a remaining dual-wire portion 140d with a vehicle terminal 140e at one end thereof and a main plug-in adapter 140g at another end thereof. The main plug-in adapter 140g includes a light indicator 140h adapted to be electrically coupled to the primary battery 122 through the main electrical lines 140 and to indicate that the main plug-in adapter 140g is electrically coupled to the primary battery 122.

Several other articles are used to complete the overall assembly. The rear electrical lines 144 include terminals 144a, 144b, 144c and 144d for electrically coupling to the anode and cathode of the secondary batteries 130 and 131. Also, a trailered plug-in adapter is co-located with a charging unit 145 at another end of the electrical lines 144. The charging unit 145 can be installed in the boat. The intermediary set of interconnecting electrical lines 142 includes a first plug-in adapter 142a at one end for releasably plugging into the main plug-in adapter 140g and electrically coupling to the primary battery 122 and a second plug-in adapter 142b at another end for releasably plugging into the trailered plug-in adapter 144c and electrically coupling to the secondary battery 130. Finally, a set of harnesses 160, such as nonconductive tie wraps, are used to secure the electrical lines. Preferably, each of the plug-in adapters is insulatively-enclosed in plastic with a female black-wire receptacle and an adjacent male red-wire receptacle for fool-proof mating.

According to another more specific example embodiment of the present invention, the above arrangement is enhanced by including a viewable indicator adapted to indicate electrical connection to the primary battery. In one implementation, the viewable indicator is within the casing of the main plug-in adapter and is electrically connected to the main lines which, in turn, connect to the primary battery. In another implementation, the viewable indicator is outside the casing of the main plug-in adapter and is electrically coupled to the main lines elsewhere, for example inside or outside the casing of the plug-in adapter of either the intermediary set or rear set of lines. The viewable indicator can be implemented, for example, using an LED (light-emitting diode).

According to another more specific example embodiment of the present invention, power shut-off is provided to the first example embodiment by including a manually-engageable resettable circuit breaker in-line with the power lead of the main set of lines. With the power lead connecting to the anode of the primary battery, problems due to a short or improper hook-up are mitigated.

Most of the above articles can be implemented as part of an assembly that is installed, for example, using the procedure outlined in the above-referenced priority patent document, U.S. Pat. No. 6,636,014.

Figure 3:
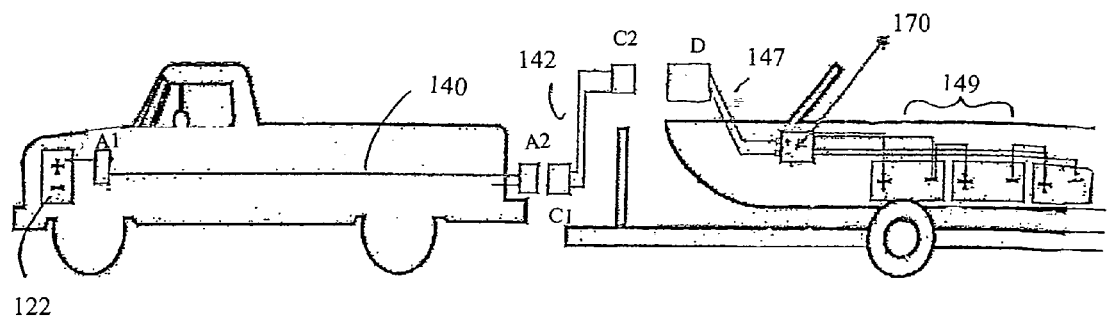
FIG. 3 is an illustration of another charging assembly, according to an example embodiment of the present invention, wherein towed batteries are installed in series.
Figure 4:
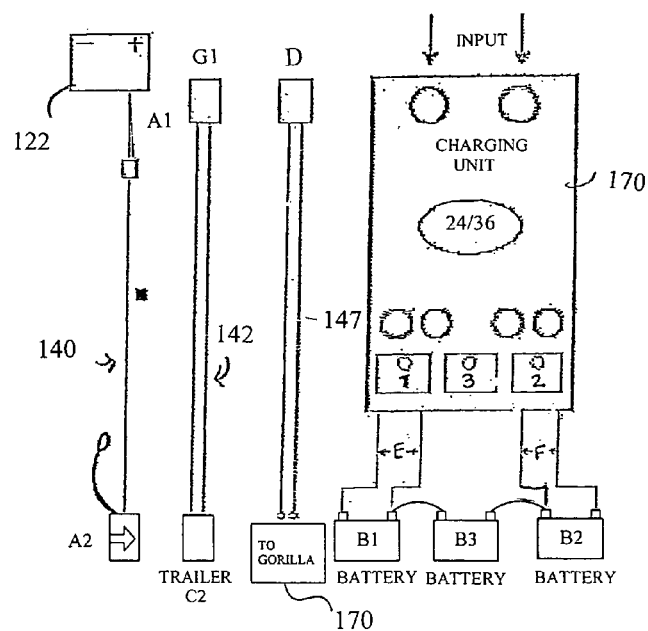
FIG. 4 is an illustration of various components used in the charging assembly of FIG. 3.

Referring now to FIGS. 3 and 4, a schematic diagram is shown as installed and uninstalled for the above-discussed trailer-based battery charging application. In the embodiment involving equipment being towed by a towing vehicle, the towing vehicle has a primary battery 122 and a rearward-located hitch (not shown) for towing the trailer that carries the equipment (or secondary) batteries B1, B3 and B2. The arrangement includes a charging unit 170, and four sets of electrical lines, each with terminals conveniently adapted for ease of use. A front (vehicle) set 140 of main electrical lines includes terminals at one end thereof for electrically coupling to the anode and cathode of the primary battery 122 and includes a main plug-in adapter A2 at another end thereof, the latter of which is typically installed at the rear of the towing vehicle. A rear (secondary battery) set 149 of rear electrical lines includes terminals at one end thereof for electrically coupling to the anode and cathode of each secondary battery and includes terminals at another end thereof for connecting to terminals at the charging unit 170. A charger set 147 of electrical lines has one set of terminals connecting to a trailered plug-in adapter D and another set of terminals at another end thereof for connecting to terminals used to provide power to the charging unit 170. An intermediary set 142 of interconnecting electrical lines includes a first plug-in adapter C1 at one end for plugging into the main plug-in adapter A2 and a second plug-in adapter C2 at another end for plugging into the trailered plug-in adapter D. The skilled artisan would appreciate that the charging arrangement can be readily modified for application to two secondary batteries B1 and B2 (e.g., 12 v plus 12 v in series for a 24 v application) for applied to three or more secondary batteries as shown above via B1, B3 and B2 (e.g., for a 36 v application).

Figure 5:
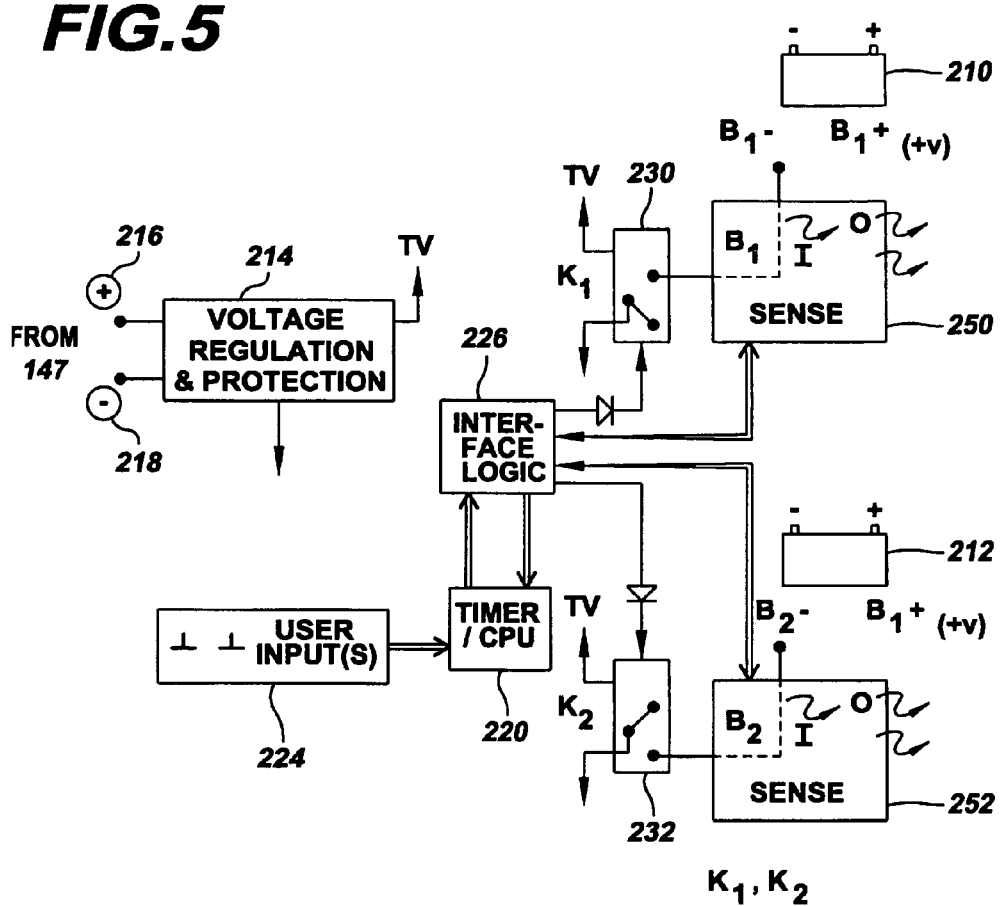
FIG. 5 is a block diagram illustrating a charging circuit, according to the present invention.

FIG. 5 illustrates an expanded block diagram of a charging circuit (similar to 170 of FIGS. 3 and 4) for an application in which two batteries 210 and 212 are charged. The towing battery provides power to the charging circuit via a voltage regulation and transient protection circuit 214 at terminals 216 and 218. Alternatively, V+ at the input of the circuit 214 can be (more) directly connected to the less-sensitive electrical components (such as the relays). A first logic circuit 220 (e.g., a programmable CPU or a resistor-capacitor-time-defined 555 timer) is adapted or programmed to control the power distribution from the towing battery to each of the two batteries 210 and 212. As discussed previously, the charging time for each battery can be stopped by timing out after a default interval with the charging function switching to the other battery after this interval. Interface logic 226 provides control signals to relays 230 and 232 for switching on/off the current flow to each of the two batteries 210 and 212 in the above-described alternating manner.

As an option, the CPU 220 can control the charging circuit in response to a user-input device (e.g., keys or switches) 224. In this manner, the charging time for each battery can be controlled by user-set (or default) intervals or by user-directed operation features such as charging and timing out as a function of a user-provided expected travel time.

Other important battery-charging features are provided by battery-current sense circuits 250 and 252. The battery-current sense circuits 250 and 252 include, respectively, LED indicators 251 and 253 that illuminate when the corresponding battery is being charged and, optionally, as a special color when the corresponding battery is fully charged.

The CPU 220 is communicatively coupled to the battery-current sense circuits 250 and 252 for operation-control and status-feedback signaling. The battery-current sense circuits 250 and 252 include current-flow monitoring (as is conventional in commercially-available automotive battery chargers) that can be used to report back to the CPU 220 (status-feedback signaling) and/or to directly control illumination of the charge indicators. For operation-control signaling, the battery-current sense circuits 250 and 252 include logic that permits signals from the CPU 220 (directly or via the interface logic) to control when the LEDs should and should not be illuminated. This control can be provided in response to the preset charge-timing interval or in response to the above-mentioned status-feedback signaling that is provided by the battery-current sense circuits 250 and 252.

One or more of these features can be provided as part of the charging circuit as a factory-activatable option that is deliverable per model number. For example, the CPU 220 can be coded, or PC lines can be broken, to disable the above mentioned feature(s) provided by the battery-current sense circuits 250 and 252.

Figure 6:
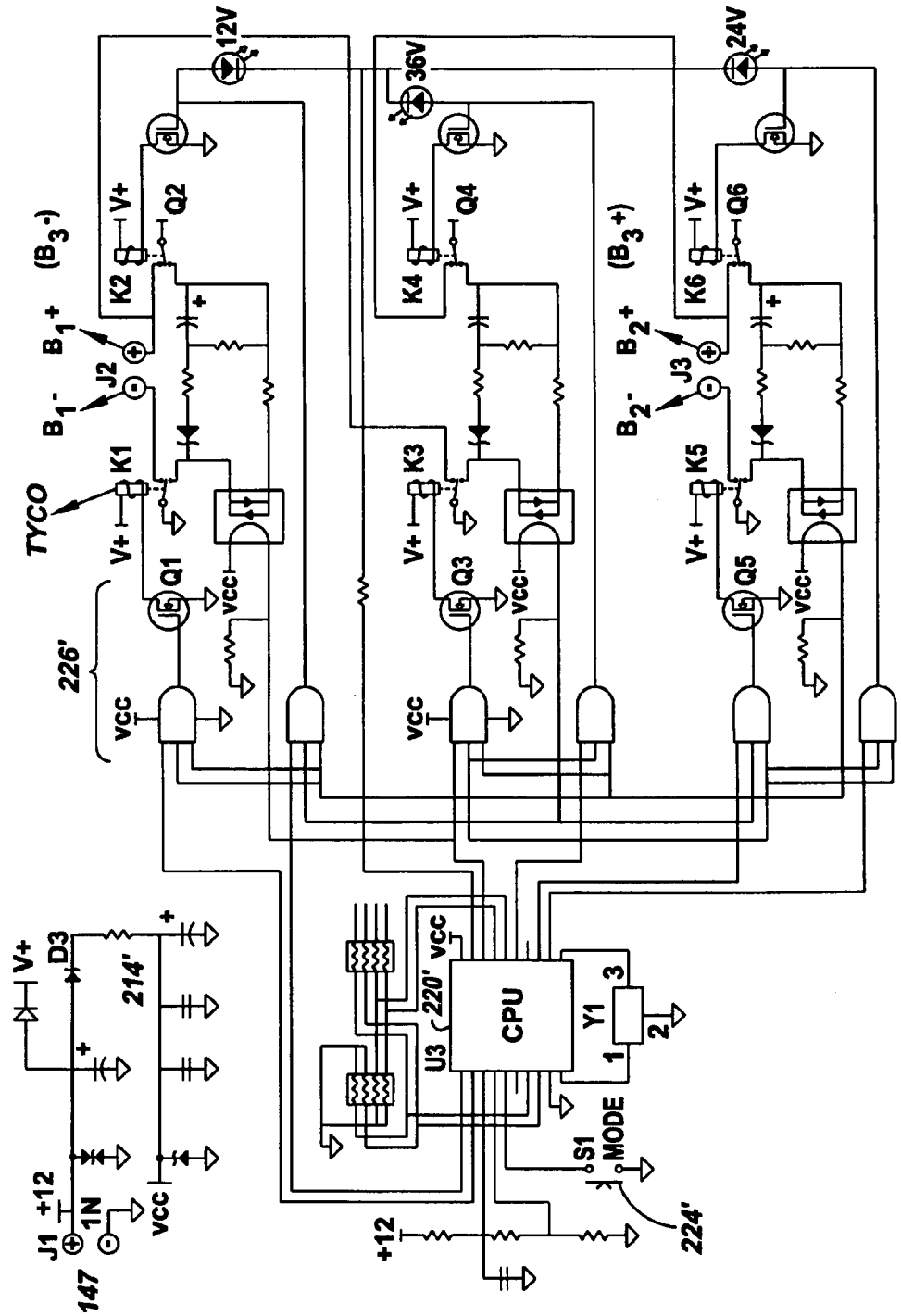
FIG. 6 is a schematic illustrating another charging circuit, also according to the present invention.

FIG. 6 illustrates another expanded block diagram of an alternative charging circuit (similar to 170 of FIGS. 3 and 4) for an application in which two or three batteries can be charged. Where common functionality is provided relative to previously-discussed figures, similar or identical reference numerals are used (e.g., 214 and 214'). The CPU 220' shown in FIG. 6 includes the optionally-programmed feature of being able to reverse polarity between the secondary battery terminals in order to accommodate, among other advantages, alternate charging for each of the three secondary batteries without requiring three mutually exclusive terminal sets.

The application shown in FIG. 6 can be implemented in a variety of manners to effect the charging of a third battery (or more batteries, with iterations of the shown circuitry being repeated). The polarity of the connections to the series of batteries is controlled to set the proper polarity for the battery coupled in series. For example, when a first battery B1 (as shown, e.g., in FIG. 4) is being charged, power is applied thereto with negative "B1–" and positive "B1+" terminals. When a second battery B2 is being charged, power is similarly applied to negative "B2–" and positive "B2+" terminals. The various relays shown in FIG. 6 are correspondingly implemented to achieve the correct polarity for the third battery B3, depending upon which terminals of B1 and B2 are coupled to B3. For instance, when the a positive terminal "B3+" of B3 is coupled in series with the negative terminal "B2–" and a negative terminal "B3–" of B3 is coupled in series with the positive terminal "B1+," the polarity of the power applied to "B2–" and "B1+" is reversed. In addition, prior to switching the polarity to selected terminals, the corresponding terminal of a battery to which polarity is being switched can be first disconnected such that polarity across the battery is not accidentally reversed. Such timing of the switching of polarity (and corresponding charging of a battery) is optionally controlled with a timing circuit that both inhibits the application of an improper polarity to a battery and controls the charge time for each battery. With this approach, the proper polarity for each battery is achieved while controlling the amount of time each battery is charged, for example by implementing a particular timing interval.

In more specific embodiments, the charging circuits of FIGS. 4, 5 and 6 can be adapted to provide automatic battery-charge detection, protection from reverse polarity installations (indicating whether battery wiring is incorrect), transient-power protection for the circuit components, multi-configurable battery charge applications (one unit for 2 or 3 secondary batteries), auto battery detection by providing a reset and automatically checking for how many batteries are connected every time the system is plugged in, circuit shutdown if a short occurs, and is useful for multiple purposes including, but not limited to, charging batteries on the road or on the water and in moving or stationary situations, charging series-connected batteries or independently-operated batteries.

In a more specific embodiment that is consistent with the circuit shown in FIG. 6, the circuitry is protected by a transient voltage suppressor diode that limits the transients to +/−30 volts and by a diode in series with the relay coils to prevent the relays from operating should the input voltage become reversed. Another diode prevents reverse polarity voltage from reaching a zener diode shunt regulator (as shown) that provides +5 volts for the logic circuitry. Simple shunt regulators are very reliable and provide maximum protection against transients. Under normal conditions, the CPU monitors the input voltage and will inhibit battery charging if this voltage is less than 10 volts, a low voltage condition, or greater than 20 volts, a 24-volt jump-start condition. Also, the charger automatically determines if the load batteries are properly wired each time the input voltage is connected/applied. This is accomplished by monitoring the voltage at the load battery terminals through 100 K-ohm resistors, which protect the logic circuitry from transient voltages. If a properly wired 24 or 36-volt system is not detected, the charger flashes the LED's for a several seconds and then shuts down. (For this feature to function properly, the input voltage should not be present when connecting the load batteries.) The charger incorporates hardware interlock circuitry to protect the batteries, relays, and system wiring from damage, should the microprocessor fail to properly execute its program. This circuitry will only allow one pair of relays to be energized at a time. Activation of the other two pairs of relays is inhibited. The interlock circuitry uses the normally closed contact on the relays. When the normally closed contact closes, a 100 uF capacitor is charged up through a 10-ohm resistor, resulting in a momentary peak current of approximately 1.2 Amp to flow in the normally closed contacts. This essentially "cleans" the relay contact so oxidation does not build up.

As shown in FIG. 6, exemplary components that may be used to implement the circuit are commercially available. For instance, the CPU 220' (driven by Y1 at 1.68 HHz) is a Philips P87LPC764 with the pins numbered from top to bottom, left side then right side, as follows: 1, 20, 19, 18, 17, 16, 15, 14, 13, 5, 6 and 15, 12, 11, 10, 9, 8, 4, 3, 2, 7. The FET switches, if purchased from Fairchild, could be implemented with Q1 as NDT3055L, Q2 as NDT3055L, Q3 as NDT3055L, Q4 as NDT3055L, Q5 as NDT3055L, and Q6 as NDT3055L. The relays, if purchased from Isocom, could be implemented with K1 as VKP, K2 as VKP, K3 as VKP, K4 as VKP, K5 as VKP, and K6 as VKP.

The various embodiments described above are provided by way of illustration only and should not be construed to limit the invention. Moreover, it will be appreciated that most, if not all, of the above-discussed aspects and features can be used by themselves or in combination in any of a variety of applications. Based on the above discussion and illustrations, those skilled in the art will readily recognize that various modifications and changes may be made to the present invention without strictly following the exemplary embodiments and applications illustrated and described herein. Such changes may include, but are not necessarily limited to: additional circuit elements, altering the types and lengths of adapters and wire harnesses. Such modifications, additions and/or changes do not depart from the true spirit and scope of the present invention that is set forth in the following claims.

What is claimed is:

1. An arrangement using a primary battery during an anticipated trailered-equipment towing period for charging a plurality of equipment batteries configured electrically in series for operation in a trailered equipment, the arrangement comprising:

a cable for electrically connecting the primary battery with the plurality of equipment batteries; and a charging circuit that is adapted to charge the equipment batteries by automatically alternating a power connection from the primary battery to each of the equipment batteries, and therein distributing charge to each of the equipment batteries during the anticipated towing period one battery at a time.

2. The arrangement of claim 1, further including a wiring harness assembly that is adapted to permit charging of the plurality of equipment batteries while the batteries are being towed, and wherein the charging circuit includes a circuit for changing polarities from the power connection when automatically alternating the power connection.

3. The arrangement of claim 2, wherein the charging circuit automatically stops charging one of the equipment batteries and begins charging another of the equipment batteries according to a circuit-defined time interval corresponding to the anticipated towing period.

4. The arrangement of claim 2, wherein the charging circuit automatically stops charging one of the equipment batteries and begins charging another of the equipment batteries according to a user-established time interval corresponding to the anticipated towing period.

5. The arrangement of claim 2, wherein the charging circuit automatically stops charging one of the equipment batteries and begins charging another of the equipment batteries in response to an indication that said one of the equipment batteries has reached a sufficiently-charged threshold level.

6. The arrangement of claim 2, wherein the charging circuit automatically stops charging one of the equipment batteries and begins charging another of the equipment batteries at a time that is defined as a function of a user-defined expected travel time.

7. A vehicle-trailering arrangement for charging during an anticipated trailered-equipment towing period a plurality of equipment batteries configured electrically in and for operation in a trailered equipment, the arrangement comprising:

a vehicle battery; and charging means for automatically charging the equipment batteries using an alternating power connection from the vehicle battery to each of the equipment batteries, and therein distributing charge to each of the equipment batteries during the anticipated towing period one battery at a time.

8. A vehicle-trailering arrangement using a primary battery located in a towing vehicle adapted to tow the trailered equipment during an anticipated trailered-equipment towing period, the arrangement for charging a plurality of trailered equipment batteries in a trailered vehicle configured electrically in series for operation of at least one accessory adapted to be operated in the trailered equipment, the arrangement comprising:

an electrical harness; and a charging circuit adapted to use the electrical harness to charge the trailered equipment batteries by automatically alternating a power connection from the primary battery to each of the trailered equipment batteries, and therein distributing charge to each of the equipment batteries during the anticipated towing period one battery at a time.

9. The arrangement of claim 8, further including a data communications link adapted to provide feedback to the charging circuit.

10. The arrangement of claim 8, further including a data communications link adapted to provide feedback to the charging circuit, and wherein the charging circuit automatically stops charging one of the equipment batteries and begins charging another of the equipment batteries in response to an indication received via the data communications link that said one of the equipment batteries has reached a sufficiently-charged threshold level.

11. The arrangement of claim 8, further including feedback means for providing feedback data from the equipment batteries to the charging circuit, and wherein the charging circuit automatically stops charging one of the equipment batteries and begins charging another of the equipment batteries in response to the feedback means.

12. The arrangement of claim 1, wherein the charging circuit is adapted to charge three equipment batteries, one at a time.

13. The arrangement of claim 12, wherein two of the three equipment batteries are arranged in series and the third battery is not in series therewith.

* * * * *